United States Patent Office 3,498,813
Patented Mar. 3, 1970

3,498,813
WAX, HYDROGENATED GLYCERIDE, CHLO-
RINATED DIPHENYL COMPOSITION
Cyril S. Treacy, Scarsdale, N.Y., assignor to M. Argueso
& Co., Inc., Mamaroneck, N.Y., a corporation of New
York
No Drawing. Original application July 1, 1966, Ser. No.
562,114, now Patent No. 3,394,095, dated July 23, 1968.
This application May 27, 1968, Ser. No. 732,048
Int. Cl. C08h 9/06
U.S. Cl. 106—268                                    2 Claims

ABSTRACT OF THE DISCLOSURE

A water insoluble composition of natural wax such as carnauba, hydrogenated glyceride, chlorinated diphenyl and the remainder of filler material.

---

This application is a division of application Ser. No. 562,114, filed July 1, 1966, now U.S. Patent 3,394,095.

This invention relates to a compound which is water insoluble and which is particularly useful in conjunction with the machining of thin walled articles where the walls or portions thereof must be rigidly held during a machining operation.

In the prior art, a problem has been presented in the holding of parts or articles requiring machining, such as cutting, grinding, routing, and the like, particularly when the walls thereof are relatively thin. The machining thereof may result in chattering, which has undesirable effects on the finished article. This becomes particularly of importance where automatically operated machine tools, such as those controlled by tape or similar means, are used. In the accurate machining of parts, they must be held tightly and there must not be a displacement of the walls thereof during the machining operation.

One of the principal objects of this invention is to provide a compound for rigidly holding objects to be machined in a manner that will result in rigidly holding for accurate machining and yet which will permit removal without damage thereto.

Another of the objects of this invention is to provide a compound for rigidly holding objects in a machine whereby a greater adhesion between the metal and holder is obtained than hitherto found possible.

One example of the use of the compound of the present invention is where the object or article to be machined is embedded therein and held on an operating table or support of the machine. The machining operations then can be performed upon the article without damage thereto. After the machine operations, the article can be removed from the table by subjecting the same to heat or a suitable solvent for removing all traces of the compound from the article.

It has been found that admixtures can be used of 4.8% by weight to 6.3% by weight of a natural wax such as carnauba, ouricury or candelilla, 2.2% to 4.7% by weight of hydrogenated glycerides such as sold under the trademark "T-57-N" by Archer Daniels Midland Company, 29% to 39% by weight of what is believed to be chlorinated diphenyl such as sold under the trademark "Aroclor 5460" by Monsanto, and 51% to 58% by weight of a filler. The total, of course, should be 100%. Preferably, the filler can comprise 38% to 42% by weight of calcium carbonate and from 20% to 9% by weight of glass fiber.

It can be theorized that the wax serves as a hardening agent and cold flow suppressant. The chlorinated diphenyl is a resin having high adhesive properties when blended with hydrogenated glyceride.

EXAMPLE I

|  | Parts by weight | Percent by weight |
|---|---|---|
| Carnauba wax | 5.50 | 5.83 |
| Aroclor 5460 | 34.00 | 35.70 |
| T-57-N | 3.70 | 3.89 |
| Elvax 250 | 3.00 | 3.13 |
| Calcium carbonate | 40.00 | 42.00 |
| Glass fiber | 9.00 | 9.45 |
|  | 95.20 | 100 |

Melt the carnauba wax, T-57-N and Aroclor and raise temperature to 135° C., stirring well while melting. Add calcium carbonate while stirring and maintaining temperature at 135° C. Add glass fiber while stirring at 135° C. Add Elvax 250 at 135° C. while stirring. Pour as cold as possible into cold pans. The melting point will be 77° C. There is no flash point or fire point up to 315° C. A slight discoloration at 226° C. and some frothing and bubbling at 237° C. which increases by 315° C. The specific gravity was 1.85 or .066 per cubic inch.

EXAMPLE II

|  | Parts by weight | Percent by weight |
|---|---|---|
| Carnauba wax | 5.50 | 4.80 |
| Aroclor 5460 | 34.00 | 29.70 |
| T-57-N | 3.70 | 3.20 |
| Elvax 250 | 5.00 | 4.30 |
| Calcium carbonate | 45.00 | 39.00 |
| Glass fiber | 21.80 | 19.00 |
|  | 115.00 | 100 |

EXAMPLE III

|  | Parts by weight | Percent by weight |
|---|---|---|
| Caranauba wax | 5.50 | 5.30 |
| Aroclor 5460 | 34.00 | 32.40 |
| T-57-N | 3.70 | 3.50 |
| Elvax 250 | 5.00 | 4.80 |
| Calcium carbonate | 40.00 | 38.00 |
| Glass fiber | 16.80 | 16.00 |
|  | 105.00 | 100 |

EXAMPLE IV

|  | Parts by weight | Percent by weight |
|---|---|---|
| Caranauba wax | 5.50 | 5.80 |
| Aroclor 5460 | 34.00 | 36.00 |
| T-57-N | 3.70 | 3.70 |
| Elvax 250 | 3.00 | 3.10 |
| Calcium carbonate | 40.00 | 42.00 |
| Glass fiber | 9.00 | 9.40 |
|  | 95.20 | 100 |

EXAMPLE V

|  | Parts by weight | Percent by weight |
|---|---|---|
| Carnauba wax | 5.50 | 5.50 |
| Aroclor 5460 | 34.00 | 34.00 |
| T-57-N | 3.70 | 3.70 |
| Elvax 250 | 3.00 | 3.00 |
| Calcium carbonate | 38.30 | 38.30 |
| Glass fiber | 8.00 | 8.00 |
| Aluminum powder | 5.00 | 5.00 |
| Aluminum flake | 2.50 | 2.50 |
|  | 100.00 | 100 |

EXAMPLE VI

| | Parts by weight | Percent by weight |
|---|---|---|
| Carnauba wax | 5.50 | 6.30 |
| Aroclor 5460 | 34.00 | 39.00 |
| T-57-N | 3.70 | 4.25 |
| Elvax 250 | 2.00 | 2.29 |
| Calcium carbonate | 35.00 | 40.13 |
| Glass fiber | 7.00 | 8.03 |
| | 87.20 | 100 |

.05% Oil Green A 1839 can be added to color.

EXAMPLE VII

| | Parts by weight | Percent by weight |
|---|---|---|
| Carnauba wax | 6.30 | 6.30 |
| Aroclor 5460 | 39.00 | 39.00 |
| T-57-N | 4.25 | 4.25 |
| Elvax 250 | 2.29 | 2.29 |
| Calcium carbonate | 40.13 | 40.13 |
| Glass fiber | 8.03 | 8.03 |
| | 100.00 | 100 |

M.P., 170° F.
Flash and Fire point, none to 600° F.
Specific gravity, 1.85 (0.66 lb./in.)

EXAMPLE VIII

| | Parts by weight | Percent by weight |
|---|---|---|
| Carnauba wax | 15.00 | 5.50 |
| Aroclor 5460 | 90.00 | 34.00 |
| T-57-N | 10.00 | 3.70 |
| Calcium carbonate | 108.00 | 40.00 |
| Glass fiber | 55.00 | 16.80 |
| | 278.00 | 100 |

EXAMPLE IX

In the compound of Example I, the carnauba wax was placed with ouricury wax with good results.

EXAMPLE X

In the compound of Example I, the carnauba wax was replaced with condelilla wax. In this case the melting point dropped from 168–70° F. to 154° F. so that if the heat generated due to the machinery operation raises too high, there will tend to be a soft, stickier chip.

"Aroclor 5460" is a chlorinated diphenyl made by Monsanto Chemical Co. and has the following properties:

Acidity—Maximum (mgm.·KOH per gm.) _____ 0.07
Average coefficient of expansion (25°–124° C.) _____ 0.00179
Density—
  Specific gravity 25°/25° C. _____ 1.670
  Pounds per gallon _____ 13.91
Flash point and fire point _____ None
Softening point ASTME-28 _____°C__ 100 to 105
Refractive Index, 20° C. _____ 1.660–1.665

"Elvax 250" is a high molecular weight ethylene vinyl acetate copolymer sold by Du Pont, "Elvax" being a trademark of Du Pont. It has the following general properties:

Inherent viscosity at 30° C. (0.25 g./100 ml. toluene) _____ 0.85
Density g./cc. at 23° C. _____ 0.951
Refractive index _____ 1.485
Tensile strength p.s.i. _____ 2.000
Elongation at break, percent (ASTM D 882) __ 750
Elastic (tensile) modulus _____ 1475
Hardness, Shore A2 durometer _____ 72
Softening point, ring & ball (ASTM E28) _____ 280
Cloud point in paraffin wax _____° F__ 150

"T-57-N" is a hydrogenated glyceride sold by Archer Daniels Midland Company, Cleveland, Ohio and has the following general properties:

Melting point _____ 59–61° C.
Acid number _____ 1 maximum.
Saponification value _____ 193–198.
Iodine value _____ 1 maximum.
Specific gravity at 100/20° C _____ 0.8450.
Color 5¼" Lovibond _____ max. 15Y/R.
Chain length acids:
  $C_{14}$ _____percent__ 0.2
  $C_{16}$ _____do____ 28.6
  $C_{18}$ _____do____ 71.2
  Unsaturated _____do____ 1.0
  Saturated _____do____ 99.0

The preferred waxes are carnauba and ouricury.

It should be apparent that details of the compounds may be changed without departing from the spirit of the invention except as defined in the appended claims.

What is claimed is:

1. A composition consisting essentially of between 4.8% and 6.3% by weight of natural wax selected from the group consisting of carnauba wax, ouricury wax and candelilla wax; 2.2% to 4.7% by weight of hydrogenated glyceride; 29% to 39% by weight of chlorinated diphenyl, said chlorinated diphenyl having the following characteristics:

Acidity—Maximum (mgm.·KOH per gm.) _____ 0.07
Average coefficient of expansion 25°–1240 C.) _____ 0.00179
Density—
  Specific gravity 25°/25° C. _____ 1.670
  Pounds per gallon _____ 13.91
Flash point and fire point _____ None
Softening point ASTME-28 _____° C__ 100 to 105.5
Refractive index, 20° C. _____ 1.660–1.665 and the remainder filler material is selected from the group consisting of calcium carbonate and glass fiber.

2. A composition according to claim 1 wherein the filled material is 30 to 40% of calcium carbonate; and 8 to 19% glass fiber.

References Cited

Payne—Organic Coating Technology (vol. 1) (Wiley) (N.Y.) (1954) pp. 367–369.

MORRIS LIEBMAN, Primary Examiner

H. H. FLETCHER, Assistant Examiner

U.S. Cl. X.R.
106—272; 156—326

UNITED STATES PATENT OFFICE
CERTIFICATE OF CORRECTION

Patent No. 3,498,813　　　　　　　　Dated March 3, 1970

Inventor(s) Cyril S. Treacy

It is certified that error appears in the above-identified patent and that said Letters Patent are hereby corrected as shown below:

Column 1, line 52, "machine" should be --machining--;
Column 2, line 65, "⁰alcium" should be --Calcium--;
Column 3, line 42, "placed" should be --replaced--;
Column 4, line 45, "25⁰ - 124⁰ C.)" should be --(25° - 124° C.)--;
Column 4, line 56, "filled" should be --filler--; Column 4, line 56, "30" should be --39--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents